United States Patent [19]

Lawrence, Jr.

[11] 4,106,399
[45] Aug. 15, 1978

[54] VEHICLE ROOF VENTILATOR INSULATION COVERING

[76] Inventor: George C. Lawrence, Jr., 294 Hickory La., Lennon, Mich. 48449

[21] Appl. No.: 775,543

[22] Filed: Mar. 8, 1977

[51] Int. Cl.[2] .............................................. B60H 1/26
[52] U.S. Cl. ........................................ 98/2.14; 98/19; 98/42 R; 98/116; 52/200; 49/62
[58] Field of Search ................ 98/2.14, 19, 42 R, 116, 98/35, 61; 52/199, 200, 72; 220/215; 49/62

[56] References Cited

U.S. PATENT DOCUMENTS

| 2,100,126 | 11/1937 | Bonsall | 98/7 |
|---|---|---|---|
| 2,372,164 | 3/1945 | Woodhams | 98/2.14 |
| 2,571,374 | 10/1951 | Mayr | 98/116 |
| 2,579,395 | 12/1951 | Pfantsch | 98/116 |
| 2,580,797 | 1/1952 | Koch | 98/116 |
| 3,350,823 | 11/1967 | Murray | 220/82 R |
| 3,417,527 | 12/1968 | Kiekhaefer | 52/200 |
| 3,421,259 | 1/1969 | Egan, Jr. | 49/62 |
| 3,473,276 | 10/1969 | Back et al. | 52/200 |
| 3,601,496 | 8/1971 | Kemp | 98/116 |
| 3,934,383 | 1/1976 | Perry et al. | 98/2.14 |

*Primary Examiner*—John J. Camby
*Assistant Examiner*—Henry C. Yuen
*Attorney, Agent, or Firm*—Clarence A. O'Brien; Harvey B. Jacobson

[57] ABSTRACT

Insulation apparatus for attachment to exterior surfaces of a roof ventilator, particularly an operating roof ventilator wherein an upper portion thereof is hingeably mounted to a fixed lower portion thereof, the invention comprises a cover formed of insulative material which fits essentially flushly over the exterior surfaces of the ventilator.

6 Claims, 4 Drawing Figures

VEHICLE ROOF VENTILATOR INSULATION COVERING

BACKGROUND AND SUMMARY OF THE INVENTION

Roof ventilating apparatus comprising a rectangular or square frame-like member formed around an opening in a roof and a hinged cover movable to open and close the opening are commonly installed in roofs of buildings, motor homes, trailers, campers, vans, and the like. These ventilator structures have typically been fabricated from metal, plastic, or similar materials. In all such situations, the external surfaces of the ventilator is exposed to ambient temperatures external of the roof in which the ventilator is located. Thus, temperature differentials occur between exterior and interior surface portions of the ventilator. When the temperature differential is sufficiently great, condensation often occurs on surfaces of the ventilator. When the condensation occurs on interior surface of the ventilator, water collects and dampens material and people within the structure in which the ventilator is located, thereby producing damage to furniture, and the like, and discomfort to people. Additionally, condensation on either exterior or interior surface of the ventilator can cause warping and other structural damage to the ventilator itself. The following U.S. patents illustrate the known developments in this field of endeavor: U.S. Pat. Nos: 2,100,126—Nov. 23, 1937, 2,372,164—Mar. 20, 1945, 2,430,335—Nov. 4, 1947, 2,810,334—Oct. 22, 1957, 3,236,170—Feb. 22, 1966, 3,350,823—Nov. 7, 1967 3,401,620—Sep. 17, 1968, 3,892,049—July 1, 1975, 3,934,383—Jan. 27, 1976.

The present invention provides an insulative external cover for roof ventilators, the present cover typically being molded of "styrofoam" or other insulative material in a thickness of between ⅜ inch and 1 inch. The present insulative cover is configured to essentially fit flushly over external portions of the ventilator. In particular, the present cover can be formed into two segments, one of which fits over the essentially rectangular upper dome member of the typical roof ventilator, which dome member is typically hinged for movement to a base member which is fitted into the roof of a vehicle or static structure. A second segment of the present invention covers external portions of the rectangular base member. The two segments of the invention have adhesive strips formed on inner surfaces thereof to facilitate attachment to the ventilator structure. The present invention is particularly useful for retrofitting of uninsulated ventilator structures since the invention can be rapidly attached to such ventilator structures.

Accordingly, it is an object of the invention to provide an insulative cover for a roof ventilator structure, which cover fits to the ventilator structure over external surface portions thereof to prevent condensation of moisture on exterior and interior surface portions thereof.

It is a further object of the invention to provide an insulative cover which can be rapidly attached to external surfaces of a roof ventilator.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
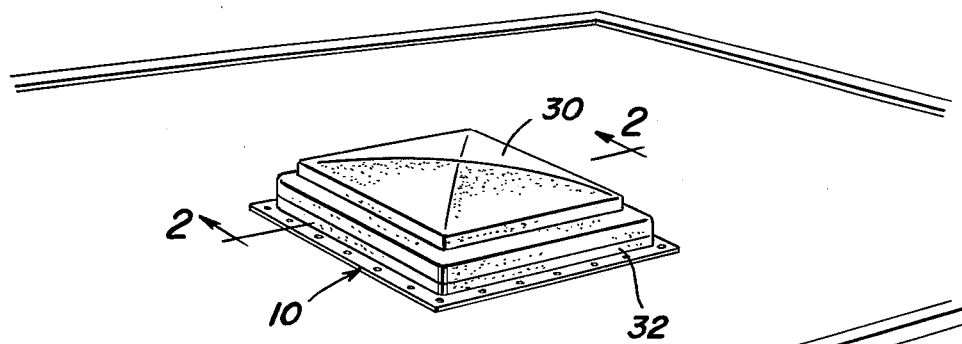
FIG. 1 is a perspective view of a roof ventilator with the present insulative cover installed thereon.
Figure 2:
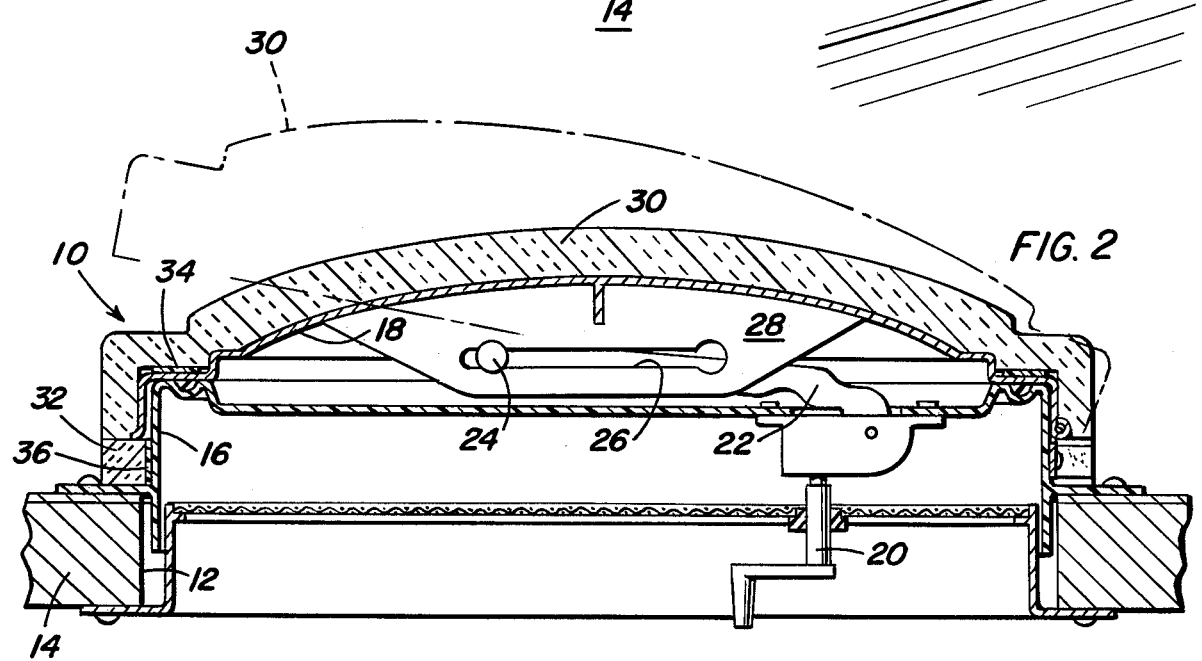
FIG. 2 is an elevational view in section of the roof ventilator and insulative cover of FIG. 1 taken along section line 2—2 of FIG. 1.

Referring now to FIGS. 1 and 2 of the drawings, a roof ventilator 10 is seen to be installed in a vent opening 12 of a roof 14 of a vehicle, building, or similar structure. The roof ventilator 10 can be formed of high-strength plastic and can be of the standard type commonly sold commercially. The ventilator 10 commonly includes a frame member 16 which is secured about peripheral edges of the opening 12 in a well-known fashion and an outer dome member 18 which is hingeably mounted to one edge portion of the frame member 16. The dome member 18 can be conventionally caused to open and close the opening 12 by use of a control handle 20 which operates, on rotation of the handle 20, a control rod 22, the control rod 22 carrying a locking ring 24 adjacent its distal end, which locking ring 24 rides within a slot 26 formed in a flange 28 connected to the underside of the dome member 18. This type of roof ventilator is disclosed in more detail in U.S. Pat. No. 3,934,383, issued Jan. 27, 1976.

The external surface of the dome member 18 is covered with an upper insulative cover 30, the cover 30 being formed of an insulative material such as "styrofoam" of a suitable thickness to provide an insulative function and to be structurally sound. The inner wall surfaces of the cover 30 are shaped to fit essentially contiguous to exterior surface portions of the dome member 18. The cover 30 is typically molded to provide an exact fit for a particular roof ventilator structure. Portions of the frame member 16 which are uncovered by the dome member 18 when the roof ventilator 10 is in the closed configuration are covered by a lower insulative cover 32, which cover 32 can be configured to fit over only three sides of the frame member 16, thereby leaving the hinged edge portion of the member 16 uncovered if desired.

Figure 3:
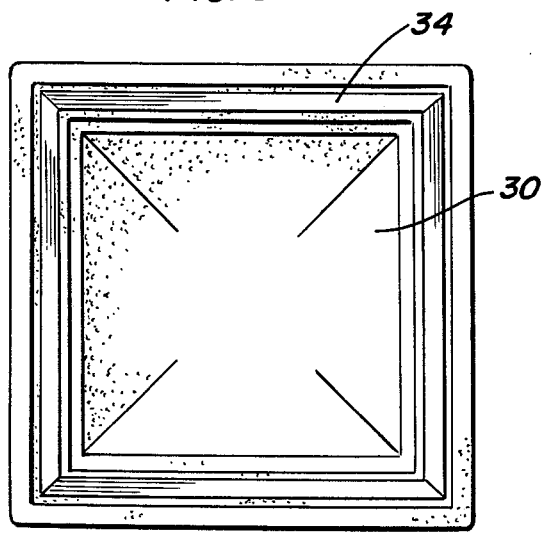
FIG. 3 is a detailed bottom view of the upper portion of the cover prior to installation thereof on a roof ventilator.
Figure 4:
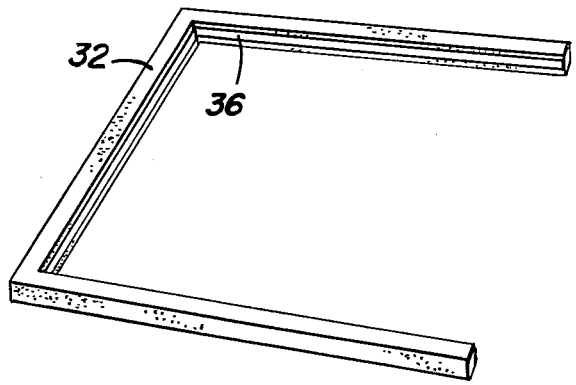
FIG. 4 is a perspective view of the lower portion of the insulative cover.

The upper insulative cover 30 is seen in FIG. 3 to have an adhesive strip 34 formed on inner surface portions thereof about the periphery of the cover 30. Similarly, in FIG. 4, the lower insulative cover 32 is provided with an adhesive strip 36 formed on inner perimetric surfaces thereof, the cover 32 shown being three-sided as discussed hereinabove. The adhesive strips 34 and 36 facilitate connection of the covers 30 and 32 to the dome 18 and frame member 16, respectively. As can be seen particularly in FIG. 2, peripheral edge portions of the covers 30 and 32 abut and fit flushly together about their peripheries when the roof ventilator 10 is in the closed configuration.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An insulative cover for a ventilator formed in a roof of a vehicle, the ventilator being comprised of a stationary frame member mounted about the periphery of an opening in the roof or the like of said vehicle and a movable dome member hingably mounted to the frame member, the insulative cover comprising:

an upper cover member formed of insulative material and having inner wall portions formed in the shape of exterior surface portions of the dome member, said inner wall portions fitting contiguously to said exterior surface portions of the dome member; and, a lower cover member formed of insulative material and having inner wall portions formed in the shape of exterior surface portions of the frame member, said inner wall portions fitting contiguously to said exterior surface portions of the frame member.

2. The insulative cover of claim 1 and further comprising adhesive means formed on inner wall portions of the upper cover member and on inner wall portions of the lower cover member to facilitate attachment of the upper and lower cover members to the dome member and frame member, respectively, of the roof ventilator.

3. The insulative cover of claim 1 wherein the upper and lower cover members are formed of molded stryrofoam, the walls of which range in thickness from ⅜ inch to 1 inch.

4. The insulative cover of claim 1 wherein the lower cover member is essentially rectangular in conformation.

5. The insulative cover of claim 4 wherein the lower cover member has three sides with an open side disposed along that side of the dome member which is hingably connected to the frame member, thereby to allow pivotal movement thereof without interference from the insulative cover.

6. The insulative cover of claim 1 and further comprising adhesive means formed on at least portions of the inner wall portions of at least the upper cover member for facilitating attachment of the insulative cover to exterior surface portions of the roof ventilator.

* * * * *